June 7, 1932.  T. W. CASE  1,861,738
CELL CAPABLE OF SHOWING THE KERR EFFECT
Filed March 26, 1928
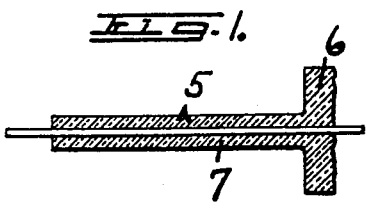
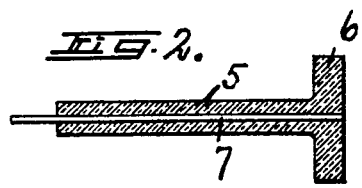 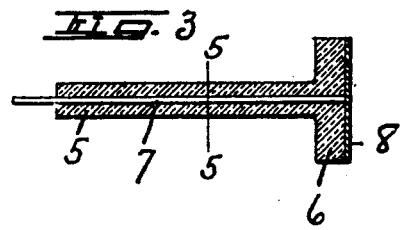
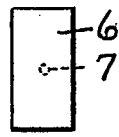 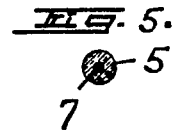
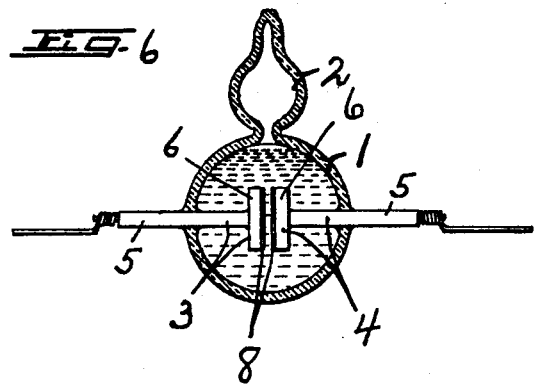
INVENTOR
T. W. Case
BY Ewison Thompson
ATTORNEYS.
WITNESS
H. P. Hurst Patented June 7, 1932

1,861,738

UNITED STATES PATENT OFFICE

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK

CELL CAPABLE OF SHOWING THE KERR EFFECT

Application filed March 26, 1928. Serial No. 264,622.

This invention relates to certain new and useful improvements in cells, and more particularly to the form and construction of an electrode or electrodes designed for use in a cell of the type showing the Kerr effect.

As has been customary in cells of this type, leading-in wires have been sealed into the glass wall of the tube or cell, and portions of the lead-in wires have remained exposed, and as a result current leaks have occurred in the cell which substantially decrease the efficiency of the cell, and the main object of this invention is to provide an electrode of such a form that these current leaks are practically eliminated.

Other objects and advantages relate to the details of the structure and form and relation of the parts thereof, all as will more fully appear from the following description taken in connection with the accompanying drawing, in which:—

Figure 1 is a sectional view of one of the steps used in producing the electrode.

Figure 2 is a similar section of a subsequent step.

Figure 3 is a similar sectional view of a subsequent step.

Figure 4 is an end view of one of the electrodes.

Figure 5 is a section on line 5—5, Figure 3.

Figure 6 is a sectional view through a cell embodying electrodes of this invention.

The cell disclosed in Figure 6 is of substantially the same form and arrangement, except as to the construction of the electrodes, as the cell disclosed in the application Serial Number 275,805, filed May 7, 1928, and in which application the said cell and its method of manufacture are claimed, the particular feature of invention herein claimed residing in the construction of the electrodes.

The cell as shown comprises an electrode chamber —1— which may be of circular form, and an expansion chamber —2— thereabove. The chamber —1— contains a suitable liquid, such as chemically pure nitro-benzine. Within the chamber —1— immersed in the liquid are positioned two electrodes —3— and —4— spaced apart in the usual manner. The form and method of construction of these electrodes is best illustrated in the previous figures.

Instead of sealing metal electrodes or lead-in wires through the wall of the chamber —1— there is provided a glass tube —5— of sufficient length to project through the wall —1— and maintain the electrode at proper position within the cell. This tube has its front end flattened at —6— to provide an enlarged area. The tungsten wire —7— is sealed within the tube —5— and projects forwardly from the flattened end —6—. The tungsten wire is then cut off flush with the forward surface of end —6— and then the said surface of the end —6— is ground into a smooth surface, and the edges of the forward end —6— are preferably ground to provide a substantially rectangular shape as perhaps best illustrated in Figure 4.

In this manner the tungsten wire —7— is provided with perfect insulation throughout its entire length, and is exposed within the bulb solely at the center of the smooth forward surface of the enlarged end —6—. A thin layer or coating of metal is then deposited or evaporated, or otherwise produced upon the smooth front surface of the rectangular portion —6— so as to have electrical connection with the tungsten wire —7— solely at the center of the rectangular end —6—, as best shown in Figure 3.

When both electrodes —3— and —4— are thus made, there will be no electrode or lead-in wire surface exposed in the cell except the opposing surfaces of the metallic electrode —8— secured to the smooth face of the rectangular end or disk —6—.

As a result there will be no current leak in the cell except exactly where it is desired, viz: across the opening between the electrodes. By this construction and operation the efficiency of the cell is considerably increased, and altho I have shown and described a specific construction and form of electrode as constituting a perhaps preferred embodiment of this invention, together with details of the method of producing the electrode, I do not desire to restrict myself to the same as various changes and modifications may be made within the scope of the appended claims.

I claim:

1. In a cell of the Kerr effect type, an electrode member comprising an insulating tube having an enlarged flattened end, a wire sealed in the tube and exposed at the enlarged flattened end, and a thin layer of conductive material secured to the forward flattened end of the tube.

2. In a cell of the Kerr effect type, an electrode chamber, a liquid within the chamber, a pair of flat substantially parallel electrodes within the chamber, and immersed in the liquid, and insulating means comprising a continuous insulating surface covering substantially all of the electrodes except the opposed surfaces.

3. In a cell of the Kerr effect type, an electrode chamber, a liquid within the chamber, a pair of electrodes within the chamber and having flat opposed parallel surfaces, the opposed surfaces of said electrodes comprising thin metallic layers, wires leading therefrom and insulating material having a continuous surface free from cracks covering all of the wires and one surface of the thin metallic layers.

4. In a cell of the Kerr effect type, an electrode chamber, a liquid within the chamber, electrodes immersed in the liquid in the chamber and having flat opposed conductive surfaces spaced apart, and means preventing leak between the electrodes except through the space between the opposed surfaces.

5. In a cell of the Kerr effect type, an electrode chamber, a liquid within the chamber, a pair of insulating tubes having enlarged flattened substantially parallel opposed surfaces sealed within said chamber and immersed in said liquid, a thin layer of conducting material on said opposed flattened surfaces, and wires leading from said conducting material through said insulating tubes to the exterior of said chamber.

6. In a cell of the Kerr effect type, an electrode chamber, a liquid within the chamber, a pair of closely spaced flat substantially parallel electrodes within said chamber and immersed in said liquid, leading-in conductors connected to said electrodes, insulating means for said electrodes comprising glass rods about said conductors having enlarged flattened ends to provide an insulating backing for said electrodes, said electrodes being supported by said insulating means.

In witness whereof I have hereunto set my hand this 15th day of March, 1928.

THEODORE WILLARD CASE.